United States Patent [19]

Ryan et al.

[11] Patent Number: 5,342,867
[45] Date of Patent: Aug. 30, 1994

[54] ADHESION PROMOTERS

[75] Inventors: Glen R. Ryan, Cambridge; Steven A. Allen, Suffolk; David A. Taylor, Cambridge, all of England

[73] Assignee: Ciba-Geigy Corporation, Ardsley, N.Y.

[21] Appl. No.: 129,703

[22] Filed: Sep. 30, 1993

[30] Foreign Application Priority Data

Oct. 6, 1992 [DE] Fed. Rep. of Germany ....... 9220988

[51] Int. Cl.$^5$ ............................................. C08L 75/04
[52] U.S. Cl. ..................................... 524/101; 524/188; 524/720; 524/728; 525/457
[58] Field of Search ................ 524/101, 188, 720, 723, 524/728; 525/457

[56] References Cited

U.S. PATENT DOCUMENTS

| | | | |
|---|---|---|---|
| 4,308,071 | 12/1981 | Gervase | 106/193 |
| 4,963,636 | 10/1990 | Mülhaupt et al. | 528/28 |
| 5,047,546 | 9/1991 | Parrinello et al. | 548/110 |
| 5,081,200 | 1/1992 | Yamaya et al. | 528/18 |
| 5,128,423 | 7/1992 | Parrinello et al. | 525/440 |
| 5,134,234 | 7/1992 | Parrinello et al. | 544/221 |

FOREIGN PATENT DOCUMENTS

| | | |
|---|---|---|
| 0268559 | 5/1988 | European Pat. Off. |
| 0376890 | 7/1990 | European Pat. Off. |
| 0414640 | 2/1991 | European Pat. Off. |
| 0491357 | 6/1992 | European Pat. Off. |

OTHER PUBLICATIONS

Chemical Abstr. 109: 191731r.
Chemical Abstr., 108(22): 188153c.
Chemical Abstr., 105(18): 1544851c.
Chemical Abstr., 105(12): 98622f.
Chemical Abstr., 104(22): 187123y.

Primary Examiner—Maurice J. Welsh
Attorney, Agent, or Firm—William A. Teoli, Jr.

[57] ABSTRACT

The present invention provides an adhesive composition comprising a polyurethane resin and, as adhesion promoter, a compound of formula I:

$$(Y{=}C{=}N)_n{-}Z[{-}NH\overset{\overset{Y}{\|}}{C}{-}X{-}R_1{-}Si(OR_2)_{3-q}(R_3)_q]_m \qquad I$$

in which Z is an organic radical which is derived from an aliphatic aromatic or heterocyclic polyisocyanate containing m+n isocyanate groups; m is a value greater than or equal to 1; n is a value greater than or equal to 0; m+n is a value greater than or equal to 2; Y is O or S; X is O, S or N—$C_1$–$C_4$ alkyl; $R_1$ is $C_1$–$C_8$ alkylene; $R_2$ is $C_1$–$C_4$ alkyl or two groups $R_2$ together for m a $C_1$–$C_4$ alkylene residue; $R_3$ is $C_1$–$C_4$ alkyl or phenyl; and q is a value from 0 to 2.

14 Claims, No Drawings

ADHESION PROMOTERS

The present invention relates to new adhesive compositions containing silane adhesion promoters.

The inherent adhesion of cured polyurethanes on to various substrates, for example glass, plastics or metal, has proved to be inadequate in many technical applications. This has led to the use of primers which enable a good bond to be obtained between the polyurethane and the substrate. High humidity, elevated temperatures and high mechanical stress have been found to have little effect on the resulting bond.

In "Silane Coupling Agents", Plueddemann et al, Plenum Press, New York (1982), aminoalkyl-alkoxysilanes have been proposed as suitable primers. It will be appreciated that aminosilane adhesion promoters per se, which are theoretically the most effective promoters, cannot be used, in un-modified form, as built-in adhesion promoters for moisture-curing polyurethanes, since the amino groups thereof would react with isocyanate groups of the polyurethanes. As a consequence, various modified aminosilanes, e.g. ketimines and aldimines of aminoalkylsilanes have been suggested, in EP 164520, for addition to polyurethane adhesives, and have been found not to impair the storage stability of the polyurethane adhesives.

In U.S. Pat. No. 4,963,636, there are described silicon-modified isophorone isocyanates having the formula:

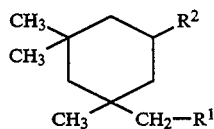

in which one of $R^1$ and $R^2$ is $-N=C=O$ and the other is $-NHC(=O)S(CH_2)_3Si(OR^3)_3$ in which $R^3$ is $C_1$–$C_4$ alkyl or phenyl. These modified isocyanates are useful as adhesion promoters for one- or two- component polyurethane adhesives.

In EP 406160 new compounds are disclosed having the formula:

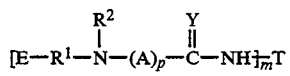

in which $R^1$ is $C_2$–$C_3$ alkylene; $R^2$ is hydrogen, $C_1$–$C_6$ alkyl optionally substituted by OH, CN or $Si(OR^3)_{3-q}R^4_q$ or is $C_2$–$C_6$ alkenyl; $R^3$ is $C_1$–$C_4$ alkyl or two residues $R^3$ together may form $C_1$–$C_4$ alkylene; $R^4$ in $C_1$–$C_4$ alkyl or phenyl; q is a value ranging from 0 to 2; E is a residue of formula $-N=CR^5R^6$ in which $R^5$ is hydrogen or $C_1$–$C_4$ alkyl and $R^6$ is hydrogen; or $R^5$ and $R^6$ together are $C_4$–$C_8$ alkylene, or E, with $R^2$, is a residue $-N(R^7)-R^8-$ in which $R^7$ is hydrogen, $C_1$–$C_4$ alkyl or $-R^9-Si(OR^3)_{3-q}R^4_q$ in which $R^3$, $R^4$ and q have their previous significance, and $R^9$ is $C_1$–$C_8$ alkylene, $R^8$ is a residue $-C(R^{10})(R^{11})-$ in which $R^{10}$ is hydrogen or $C_1$–$C_4$ alkyl and $R^{11}$ is hydrogen, or $R^{10}$ and $R^{11}$ together are $C_4$–$C_8$ alkylene, A is $-[(CH_2)_r-O-]$ in which r is 1,2 or 3; p is 0 or 1; Y is oxygen or sulphur; T is a residue $-R^9-Si(OR^3)_{3-q}R^4_q$, a residue $-Z-[NH-C(=Y)-X-R^9-Si(OR^3)_{3-q}R^4_q]_n$ or, if $R^7$ is $-R^9-Si(OR^3)_{3-q}R^4_q$ and m is a value $\geq 2$, T is an m-valent residue Z, in which $R^3$, $R^4$, $R^9$, Y and q have their previous significance; X is $-S-$ or $-NH-$; Z is an organic residue derived from a polyisocyanate or polyisothiocyanate having at least 2 NCO- or NCS- groups, respectively; m is $\geq 1$; and n is $\geq 1$.

These compounds can be used as adhesion promoters in 1- or 2- component polyurethane resin adhesives, —sealing materials, —lacquers and —insulating materials, providing significantly increased adhesion on glass, lacquered steel and plastics, without impairing the curing rate, or even increasing it.

In Example 4 of EP 406160, there is described the compound of formula:

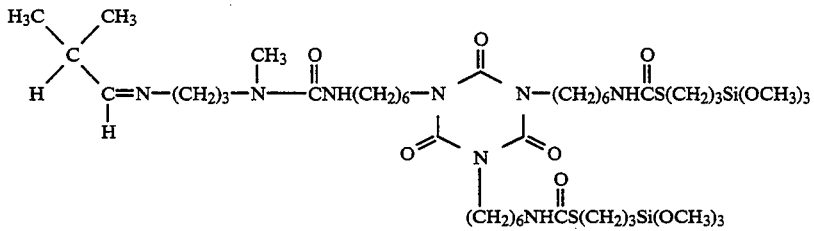

This fully reacted polyisocyanate compound is produced by reacting partially trimerized hexamethylene diisocyanate having an isocyanate content of 21.6% (Desmodur N3200-Bayer A.G.), with 3-mercaptopropyltrimethoxysilane and N-methyl-3-(2-methylpropylimino)-propylamine.

We have now found certain partly silicon-modified polyisocyanates which can be readily produced from cheap starting materials, have excellent adhesion promoting properties in polyurethane adhesives, as well as improved storage stability properties.

Accordingly, the present invention provides an adhesive composition comprising a polyurethane resin and, as adhesion promoter, a compound having the formula I:

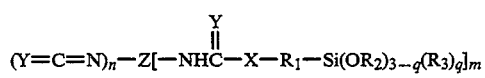

in which Z is an organic radical which is derived from an aliphatic, aromatic or heterocyclic polyisocyanate containing m+n NCO groups; m is a value greater than or equal to 1, preferably 1,2 or 3; n is a value greater than or equal to 0, preferably 0,1,2 or 3 and m+n is a value greater than or equal to 2, preferably 2,3 or 4; Y is O or S, preferably O; X is O, S or N—$C_1$–$C_4$ alkyl, preferably S; $R_1$ is $C_1$–$C_8$ alkylene; $R_2$ is $C_1$–$C_4$ alkyl, or two groups $R_2$ together are $C_1$–$C_4$ alkylene; $R_3$ is $C_1$–$C_4$ alkyl or phenyl; and q is a value from 0 to 2, preferably 0.

When $R_1$ is $C_1$–$C_8$ alkylene it may be e.g., branched, but it is preferably linear. Examples of such alkylene groups $R_1$ are methylene, ethylene, propylene, trimethylene, tetramethylene, 2-methyl-1,3-trimethylene, pentamethylene, 2-methyl-1,4-tetramethylene, 3-propyl-1,3-trimethylene, 1,6-hexamethylene, 1,7-heptamethylene, 1-octamethylene and 2-ethyl-1,2-hexamethylene, especially trimethylene.

$C_1$–$C_4$ alkylene groups formed by two groups $R_2$ may be branched, but are preferably linear. Examples include methylene, ethylene, propylene, trimethylene, tetramethylene, and 2-methyl- 1,3-trimethylene.

$C_1$–$C_4$ alkyl groups $R_1$ or $R_3$ or the $C_1$–$C_4$ alkyl component of N—$C_1$–$C_4$ alkyl groups X, are, e.g. methyl, ethyl, n-propyl, isopropyl, n-butyl, isobutyl or tert-butyl, especially methyl.

The radical Z is derived from a polyisocyanate containing at least two isocyanate groups. The polyisocyanate may be produced by any of various conventional techniques.

For example, a polyamine, e.g. an amine-terminated polyether polyol may be reacted with phosgene; or a diioscyanate may be oligomerized, e.g. hexamethylene diisocyanate may be partially hydrolysed to a biuret-containing product (e.g. Desmodur N100 ex Bayer); or diisocyanates such as hexamethylene diisocyanate may be partially trimerized to form higher functional polyisocyanates which contain isocyanurate rings (e.g. Desmodur N3200, ex Bayer); or diisocyanates can be chain lengthened by reacting them with polyfunctional H acid compounds having a functionality of at least three, e.g. triols, tetrols, pentols, triamines or tetramines.

The polyisocyanates so obtained may be used directly to produce the compounds of formula I of the present invention, or they may be firstly reacted with diols, polyols, diamines or polyamines to form NCO- terminated prepolymers.

Diisocyanates useful in producing compounds of formula I may be e.g. aliphatic, mono- or bi-cyclic aromatic compounds or heterocyclic compounds such as hexamethylene diisocyanate, trimethylhexamethylene diisocyanate, phenyl diisocyanate, toluylene diisocyanate, xylylene diisocyanate, tetramethylxylylene diisocyanate, diphenylmethane diisocyanate or naphthylene diisocyanate.

Preferably Z is derived from an aliphatic, aliphatic aromatic, aromatic or heterocyclic radical. The radical Z may contain one or more amide, ester, ether, urethane, thiourethane, isocyanate, urea or biuret functions. Particularly preferred compounds of formula I are those wherein Z is derived from an aliphatic or heterocyclic polyisocyanate having two or more NCO groups, which radical Z may contain altogether one or two amide, ester, ether, urethane, thiourethane, isocyanurate, urea or biuret functions. If Z in compounds of formula I contains ether oxygen atoms, then such compounds may be monoethers or oligoethers, for example a group of formula

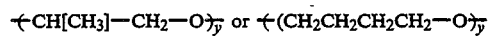

where y is an integer from 1 to 80, preferably from 1 to 20.

If Z in the compounds of formula I carries carbamate groups, then the compounds are derivatives which are obtainable by reacting polyols with compounds containing isocyanate groups. The radical Z will also be understood as including radicals which contain one or more urethane groups as well as one or more thiourea groups, for example those which contain a linking group of formula

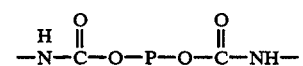

or

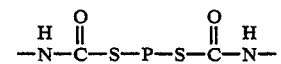

wherein P is the radical of the polyol.

If Z in the compounds of formula I carries urea groups, then such compounds of formula I are derivatives which can be obtained by reacting polyamines with compounds containing isocyanate groups. Radical Z can contain one or more urea groups, and includes radicals containing a linking group of formula:

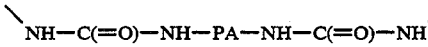

in which PA denotes the residue of a polyamine. Hydroxyl-terminated polyethers or polyesters may also be suitable for use as polyols.

In preferred compounds of formula I, the radical Z contains two ester, carbamate, isocyanurate, urea or biuret functions, and, in particularly preferred compounds, contains one such function. The ether functions are by way of being an exception here, as they are able—as mentioned above—to form oligoether linking groups. Such compounds may therefore contain up to 80, preferably up to 20, ether functions.

Specific examples of compounds of formula I are those set out in the following Table:

TABLE 1

| n | Z | m | Y | X | $R_1$ | $R_2$ | q |
|---|---|---|---|---|---|---|---|
| 1 | —$(CH_2)_6$—N—[C(=O)—NH$(CH_2)_6$]$_2$ | 2 | O | S | $(CH_2)_3$ | $CH_3$ | 0 |
| 2 | —$(CH_2)_6$—N—[C(=O)—NH$(CH_2)_6$]$_2$ | 1 | O | S | $(CH_2)_3$ | $CH_3$ | 0 |
| 1 | ɟ$(CH_2)_6$—NHC(=O)—OCH$_2$ɟ$_\overline{x}$C | 3 | O | S | $(CH_2)_3$ | $CH_3$ | 0 |
| 2 | ɟ$(CH_2)_6$—NHC(=O)—OCH$_2$ɟ$_\overline{x}$C | 2 | O | S | $(CH_2)_3$ | $CH_3$ | 0 |
| 1 | (isocyanurate ring structure with three —$(CH_2)_6$— arms) | 2 | O | S | $(CH_2)_3$ | $CH_3$ | 0 |

TABLE 1-continued

| n | Z | m | Y | X | R₁ | R₂ | q |
|---|---|---|---|---|----|----|---|
| 2 | -(CH₂)₆-N[isocyanurate ring with two other N-(CH₂)₆- and N-(CH₂)₆-] | 1 | O | S | (CH₂)₃ | CH₃ | 0 |
| 0 | -(CH₂)₆-N[isocyanurate ring with two other N-(CH₂)₆- and N-(CH₂)₆-] | 3 | O | S | (CH₂)₃ | CH₃ | 0 |
| 1 | -C₆H₄-CH₂-C₆H₄- | 1 | O | S | (CH₂)₃ | CH₃ | 0 |

The compounds of formula I used in the present invention may be produced by methods which are well-known per se.

The silane starting materials are known compounds, indeed some are available on a commercial basis. Further guidance on these starting - materials can be found in "Silane Coupling Agents", by Plueddemann (supra).

The polyisocyanate starting materials are often commercially available. Those which are not may be prepared by methods which are well-known, e.g. as described in U.S. Pat. Nos. 3,492,330, 3,394,164 and 3,567,763; GB Patent Specification 889050, 956474, 994890 and 1072956; German Patent Specifications 1101394, 1022789, 1222067, 1231688 and 1027394; DE-OS 1929034 and 2004048; and Belgian Patent 723640.

The reaction of the polyisocyanate and silane starting materials is normally conducted in the absence of a solvent. If desired, however, e.g. in order to modify the viscosity of the reaction mixture, an inert organic solvent may be used. Any hydroxyl group- free solvent may be used e.g. an aromatic hydrocarbon such as toluene or xylene; cyclohexanone; or a halogenated hydrocarbon such as 1,2-dichloro-ethane.

The reaction is normally performed at a temperature ranging from 15° to 200° C., preferably from 30° to 140° C.

Although a catalyst is not essential, a catalyst may be used, if desired. Examples of such catalysts are triethylamine, N-methylmorpholine, N,N,N',N'-tetramethylethylenediamine, 1,4-diazobicyclo [2,2,2] octane or an organotin compound such as stannous carboxylates, e.g. stannous acetate, octoate or - laurate, or dialkyltin carboxylates such as dibutyl tin or dioctlytin diacetate or dibutyltin dilaurate.

The relative amounts of the silane and polyisocyanate reactants are so chosen that the end product of formula I optionally contains free isocyanate groups. Accordingly the isocyanate content of the final adhesion promoter is in the range 30 to 0%, preferably in the range 20 to 0% and more preferably 15 to 0%.

As already indicated, the compounds of formula I are useful as adhesion promoters, in two component or one component polyurethane resins and especially in moisture-curable (single component) polyurethane resins, which find use as adhesives, sealing compounds, paints or insulating materials.

The use of the compounds of formula I as built-in adhesion promoters in these substrates renders superfluous any pretreatment of the bonding surfaces with a primer, e.g. in the bonding of automobile windscreens or headlamps.

If the substrate is a moisture-curable polyurethane, then it contains, as main constituent, polyfunctional isocyanates and/or polyurethane prepolymers, e.g. aromatic, aliphatic monocyclic or polycyclic polyfunctional isocyanate compounds. Thus, in a first embodiment of the invention, toluylene diisocyanate or diphenylmethane diisocyanate may be used as aromatic isocyanate compound. Technical diphenylmethane diisocyanate, having a content of higher functional diisocyanates and an isocyanate group functionality greater than 2, is especially suitable. A further suitable aliphatic diisocyanate is xylylene diisocyanate. It is further possible to use a wide range of aliphatic isocyanates having a functionality of 2 or more. In this connection, isophorone diisocyanate and dicyclohexylmethane diisocyanate are illustrative of cyclic aliphatic diisocyanates. Further examples are the aliphatic linear diisocyanates obtained by phosgenation of diamines, for example tetramethylene diisocyanate or hexamethylene diisocyanate.

A preferred embodiment of the invention comprises the use of polyurethane prepolymers instead of polyfunctional isocyanate compounds. In this context, prepolymers will be understood as meaning the adducts of an excess of polyfunctional isocyanates with polyfunctional alcohols, for example the reaction products of one of the above mentioned aromatic or aliphatic diisocyanates with ethylene glycol, propylene glycol, glycerol, trimethylolpropane or pentaerythritol. Reaction products of diisocyanates with polyether polyols, for example polyether polyols derived from polyethylene oxide or derived from polypropylene oxide can also be used. Polyurethane prepolymers derived from polyether polyols having molecular weights in the range from 200 to 10,000, preferably from 500 to 3000, are preferred. A host of such polyether polyols are known to the skilled person in the field of polyurethane chemistry.

They are available from numerous suppliers and are characterised by their molecular weight (number average) which can be calculated from end group analyses. Further suitable polyether polyols are those derived from polytetrahydrofuran.

Instead of using polyether polyols it is also possible to use polyester polyols. Suitable polyester polyols are reaction products of polyfunctional acids with polyfunctional alcohols, for example polyesters derived from aliphatic and/or aromatic dicarboxylic acid and polyfunctional alcohols having a functionality of 2-4. Thus polyesters of adipic acid, sebacic acid, phthalic acid, hydrophthalic acid and/or trimellitic acid on the one hand, and ethylene glycol, propylene glycol, neopentyl glycol, hexane glycol, glycerol and/or trimethylolpropane on the other, can be used. Particularly suitable are polyester polyols having a molecular weight (number average) in the range from 500 to 5000, preferably from 600 to 2000. Further suitable polyester polyols are the polyadducts of caprolactone with alcohols having a functionality of 2-4, for example the poly adduct of 1 to 5 mol of caprolactone with 1 mol of ethylene glycol, propylene glycol, glycerol and/or trimethylolpropane.

A further suitable class of polyfunctional alcohols is that of the polybutadienols. These alcohols are oligomers derived from butadiene and contain OH end groups. Suitable products are those in the molecular weight range from 200 to 4000, preferably from 500 to 3000. Siloxane prepolymers, preferably in conjunction with other prepolymers, are also suitable.

In the preparation of the polyurethane prepolymers, the ratio of OH groups of the alcohol component to isocyanate groups is important. This ratio is usually from 1:2 to 1:10. Greater excesses of isocyanate will result in more or less low viscosity polyurethane prepolymers, whereas smaller excesses of isocyanate usually give formulations which are only spreadable with a trowel.

The polyurethane expert knows that the density of the crosslinking, and hence the brittleness of polyurethanes, increases with the functionality of the isocyanate component or also that of the polyol. Reference is made in this connection to the general technical literature, for example to the monograph of Saunders and Frisch "Polyurethanes, Chemistry and Technology", Volume XVI of the series High Polymers, Interscience Publishers, New York/London, Part I (1962) and Part II (1964).

The polyurethane formulations of this invention may additionally contain different modifiers. Fillers, for example, may be added to them. Suitable fillers are inorganic compounds which do not react with isocyanates, for example chalk or ground lime, precipitated and/or pyrogenic silicic acids, zeolites, bentonites, ground minerals as well as other inorganic fillers known to the person skilled in the art, especially ground fibres. For some applications it is preferred to use fillers which impart thixotropic properties to the formulations, for example swellable plastics, preferably PVC.

In addition to containing the cited compounds, the polyurethane formulations of this invention may contain other auxiliaries such as solvents. Suitable solvents are those which do not themselves react with isocyanate groups, for example halogenated hydrocarbons, esters, ketones and aromatic hydrocarbons. Plasticisers, flame retardants, retarders, colourants and ageing inhibitors, conventionally added to polyurethane adhesives and sealing compounds, may be incorporated in the polyurethane formulations.

For some applications it is desirable to add foam stabilisers to the polyurethane formulations of the invention. These foam stabilisers may be silicone surfactants. These surfactants are block polymers obtained from a polysiloxane block and one or more polyoxyethylene and/or polyoxypropylene blocks. The polyurethane formulations of this invention may also contain flame inhibiting and plasticising modifiers. Commonly used modifiers of this kind are those containing phosphorus and/or halogen atoms, for example tricresyl phosphate, diphenylcresyl phosphate, tris(2-chloroethyl)phosphate, tris(2-chloropropyl)phosphate and tris(2,3-dibromopropyl)phosphate. In addition it is also possible to use flame retardants, for example chlorinated paraffins, halophosphides, ammonium phosphate and resins which contain halogens and phosphorus. Further additives which may be useful for certain applications are plasticisers. Suitable plasticisers may typically be phthalates or esters of long-chain dicarboxylic acids, for example sebacates or azelates. Epoxy plasticisers such as epoxidised fatty acid derivatives may also be used.

Other possible additives are basic accelerators. Basic accelerators are typically bis(N,N-dimethylamino)-diethyl ether, dimethylaminocyclohexane, N,N-dimethylbenzylamine, N-methylmorpholine as well as the reaction products of dialkyl(β-hydroxyethyl)amine with monoisocyanates and esterification products of dialkyl(β-hydroxyethyl)amine and dicarboxylic acids. Another useful accelerator is 1,4-diaminobicyclo[2,2,-2]octane. It is, moreover, possible to use non-basic compounds as accelerators, for example metal compounds such as iron pentacarbonyl, nickel tetracarbonyl, iron acetylacetonate as well as tin (II) 2-ethylhexanoate, dibutyltin dilaurate or molybdenum glycolate.

The compounds of formula I are added to polyurethane resins in an amount of 0.1-20% by weight, more particularly 0.5-15% by weight and, most preferably, 0.5-10% by weight, based on the resin.

The following Examples further illustrate the present invention.

Preparation of Silyl-isocyanates

EXAMPLE 1

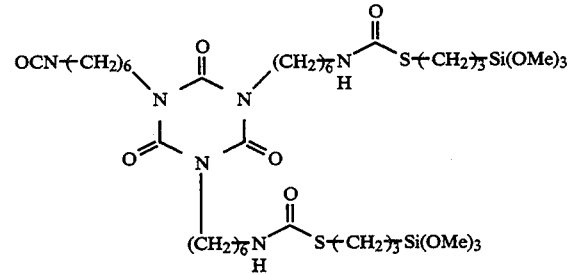

Desmodur N3200 ® (Bayer A.G.) (22.8% NCO, 51.0 g, 0.27 moles NCO) is heated to 80° C. under nitrogen and then (3-mercaptopropyl)trimethoxysilane (Fluka) (35.2 g, 0.18 moles) is added, dropwise, over 1 hour, with stirring. The mixture is then heated at 130° C. until the isocyanate content has dropped to 4.7% (ca.

EXAMPLE 2

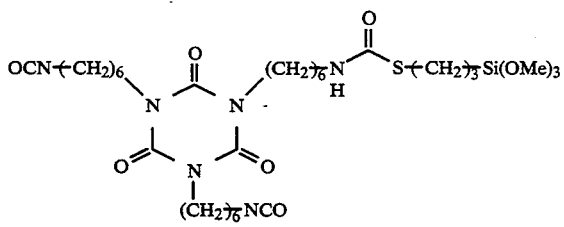

Desmodur N3200 (50.0 g, 0.27 moles NCO) and (3-mercaptopropyl)trimethoxysilane (17.3 g, 0.09 moles) are reacted as in Example 1 to afford a viscous liquid product having an isocyanate content of 11.5% (theoretical 11.2%).

EXAMPLE 3

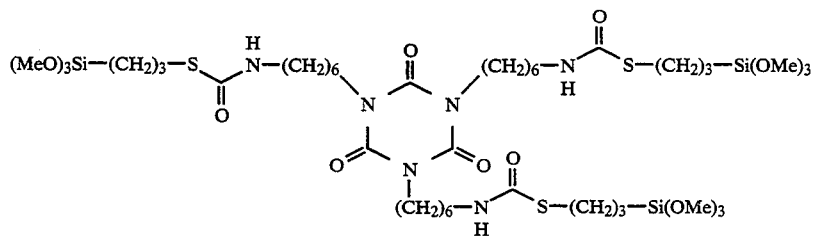

Desmodur N3200 (53.0 g, 0.29 moles NCO) and (3-mercaptopropyl)trimethoxysilane (56.3 g, 0.29 moles) are reacted together as in Example 1 to afford a viscous liquid product having an isoycanate content of 0.3% (nil by I.R.) (theoretical 0%).

EXAMPLE 4

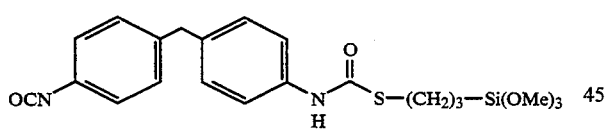

Methylenediphenyldiisocyanate (MDI) (50.0 g, 0.38 moles NCO) and (3-mercaptopropyl)trimethoxysilane (39.2 g, 0.20 moles) are reacted as in Example 1 to afford a viscous liquid product having an isocyanate content of 9.0% (theoretical 8.5%).

EXAMPLE 5

Desmodur E25 (Bayer) (2.76% NCO, 100 g, 0.066 moles NCO) and (3-mercaptopropyl)trimethoxysilane (6.5 g, 0.033 moles) are reacted as in Example 1 except that the reaction mixture is held at 80° C. for 15 hours to afford a viscous liquid product having an isocyanate content of 1.59% (theoretical 1.30% ).

EXAMPLE 6

Desmodur E41 (Bayer) (4.8% NCO, 100 g, 0.114 moles NCO) and (3-mercaptopropyl)trimethoxysilane (11.2 g, 0.055 moles) are reacted as in Example 1 except that the reaction mixture was held at 80° C. for 8 hours to afford a viscous liquid product having an isocyanate content of 2.25% (theoretical 2.2%).

EXAMPLE 7

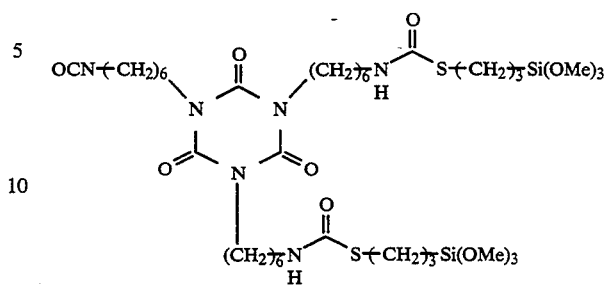

Tolonate HDT (Rhone Poulenc) (22.0% NCO, 60.2 g; 0.315 moles NCO) and dibutyltindilaurate (DBTL) (0.1 g) are heated to 80° C. under nitrogen and then (3-mercaptopropyl)trimethoxysilane (41.3 g, 0.21 moles) is added, dropwise, over 1 hour, with stirring. The mixture is then heated at 80° C. until the isocyanate content has dropped to 4.5% (ca. 15 hours, theoretical 4.3%). The product, a viscous liquid, is cooled and stored under an inert atmosphere.

EXAMPLE 8

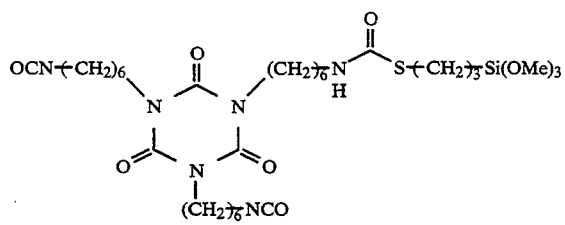

Tolonate HDT (50.0 g, 0.26 moles NCO), DBTL (0.1 g) and (3-mercaptopropyl)trimethoxysilane (17.5 g, 0.09 moles) are reacted as in Example 7 to afford a viscous liquid product having an isocyanate content of 11.0% (theoretical 10.7%).

EXAMPLE 9

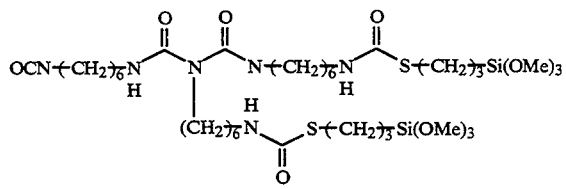

Tolonate HDB (Rhone Poulenc) (21.7% NCO, 51.0 g, 0.26 moles NCO), DBTL (0.1 g) and (3-mercaptopropyl)trimethoxysilane (34 g, 0.17 moles) are reacted as per Example 7 to afford a viscous liquid product having an isocyanate content of 5.5% (theoretical 4.4%).

EXAMPLE 10

$$OCN-(CH_2)_6-N(H)-C(=O)-N((CH_2)_6-NCO)-C(=O)-N(H)-(CH_2)_6-N(H)-C(=O)-S-(CH_2)_3-Si(OMe)_3$$

Tolonate HDB (50 g, 0.258 moles NCO), DBTL (0.1 g) and (3-mercaptopropyl)trimethoxysilane (17.0 g, 0.087 moles) are reacted together as per Example 7 to afford a viscous liquid product having an isocyanate content of 11.1% (theoretical 10.7%).

Formulation of Adhesives for Adhesion Testing on Glass

EXAMPLES 11 to 20

Formulation of the products from Examples 1–10 is accomplished by mixing Desmodur E25 (Bayer) (100 g) and the adhesion promoter (10 g) under vacuum (50 mmHg) for 2 hours. The formulations are the applied to glass which has been washed with acetone and dried. Samples are allowed to cure to ambient temperature and ca. 75% relative humidity for two weeks. The resulting adhesion described in Table 1 is a measure of how easily the resin could be peeled from the glass.

TABLE 2

Evaluation of Silyl-isocyanates for Adhesion on Glass
Formulation: Desmodur E25 (Bayer) (100 g) plus adhesion promoter (10 g)

| Example | Adhesion Promoter/ Example No. | No. of Silanes | Adhesion on Glass (see note 1) |
|---|---|---|---|
| — | None | 0 | ** |
| 11 | 10 | 1 | **** |
| 12 | 9 | 2 | ***** |
| 13 | 8 | 1 | *** |
| 14 | 7 | 2 | *** |
| 15 | 4 | 1 | **** |
| 16 | 2 | 1 | ***** |
| 17 | 1 | 2 | ***** |
| 18 | 3 | 3 | ***** |
| 19 | 6 | 1 | ***** |
| 20 | 5 | 1 | ***** |

Note 1:
* = peels easily
** = peels with some resistance
*** = peels with difficulty
**** = ca. 50% of material remains on substrate
***** = 100% of material remains on substrate

EXAMPLES 21 to 25

Formulations are produced by mixing predried Desmophen 550U (Bayer) (97 g) under vacuum with Desmodur E25 (Bayer) (951 g) at 70° C. until a prepolymer with an NCO content of 1.70% is produced. Butyl benzyl phthalate (377.4 g) is added and the mixture is stirred at 70° C. for a further 2 hours under vacuum (50 mm Hg). The resulting mixture (A) has a NCO content of 1.25%.

The mixture (A) (160 g) is degassed under vacuum (10 mm Hg) at room temperature for 90 minutes. Predried fillers (80 g, carbon black and fumed silica) are added in two portions and the resulting paste is mixed under vacuum (10 mm Hg) for 90 minutes at room temperature. Finally dibutyl tin dilaurate (0.25 g), p-toluenesulphonyl isocyanate (0.25 g) and the adhesion promoter (5g) are added.

The formulations are applied to glass which has been washed with acetone and dried. Samples are allowed to cure in the open laboratory for 2 weeks and are then immersed in water for a further two weeks. The resulting adhesion described in Table 3 is a measure of how easily the resin can be peeled from the glass.

TABLE 3

| Example | Adhesion Promoter/ Example No. | No. of Silanes | Adhesion on Glass (see note 1) |
|---|---|---|---|
| 21 | None | 0 | * |
| 22 | 9 | 2 | ***** |
| 23 | 1 | 2 | ***** |
| 24 | 7 | 2 | ***** |
| 25 | 4 | 1 | *** |

Adhesion on Glass = ***** (see note 1).

EXAMPLE 26

A mixture of Adiprene LW 520 (Uniroyal, 4.75% NCO) (137 g) and the adhesion promoter described in Example 1 (13.5 g) are stirred at room temperature under vacuum (50 mm Hg) for 15 minutes. p-Toluenesulphonyl isocyanate (0.3 g) is added and the mixture is stirred for a further hour under vacuum. Dibutyl tin dilaurate (0.15 g) is added and the mixture is stirred for a further 2 hours under vacuum at room temperature.

The mixture is applied to glass which has been washed with acetone and dried. The sample is allowed to cure in the open laboratory for 2 weeks and then is immersed in water for a further 2 weeks. Finally, the quality of adhesion to glass is described as a measure of how easily the resin can be peeled from the glass.

We claim:

1. An adhesive composition comprising a polyurethane resin and, as adhesion promoter, a compound of formula I:

$$(Y=C=N)_n-Z[-NHC(=Y)-X-R_1-Si(OR_2)_{3-q}(R_3)_q]_m \quad I$$

in which Z is an organic radical which is derived from an aliphatic, aromatic or heterocyclic polyisocyanate containing m+n isocyanate groups; m is a value greater than or equal to 1; n is a value greater than or equal to 0; m+n is a value greater than or equal to 2; Y is O or S; X is O, S or N—$C_1$-$C_4$ alkyl; $R_1$ is $C_1$-$C_8$ alkylene; $R_2$ is $C_1$-$C_4$ alkyl or two groups $R_2$ together for m a $C_1$-$C_4$ alkylene residue; $R_3$ is $C_1$-$C_4$ alkyl or phenyl; and q is a value from 0 to 2.

2. A composition according to claim 1 in which m and n, independently, are each 1, 2 or 3.

3. A composition according to claim 2 in which the sum of m and n is 2, 3 or 4.

4. A composition according to claim 1 in which Y is O.

5. A composition according to claim 1 in which X is S.

6. A composition according to claim 1 in which $R_1$ is trimethylene.

7. A composition according to claim 1 in which $R_2$ is methyl.

8. A composition according to claim 1 in which q is 0.

9. A composition according to claim 1 in which Z is derived from an aliphatic, aliphatic-aromatic, aromatic or heterocyclic polyisocyanate and optionally containing one or more amide, ester, ether, urethane, thiourethane, isocyanate, urea or biuret functions.

10. A composition according to claim 9 in which Z is derived from an aliphatic or heterocyclic polyisocyanate having 2 or more isocyanate groups and optionally containing one or two amide, ester, ether, urethane, thiourethane, isocyanate, urea or biuret functions.

11. A composition according to claim 9 in which Z is a radical containing a linking group of formula:

—NH—C(=O)—O—P—O—C(=O)—NH— or
—NH—C(=O)—S—P—S—C(=O)—NH— in which P is the radical of a polyol.

12. A composition according to claim 9 in which Z is a radical containing a linking group of formula:

—NH—C(=O)—NH—PA—NH—C(=O)—NH— in which PA in the residue of a polyamine.

13. A composition according to claim 1 which contains 0.1–20% by weight, based on the resin, of a compound of formula I.

14. A composition according to claim 13 which also comprises one or more additives selected from the group consisting of fillers, solvents, plasticizers, flame retardants, retarders, colourants, ageing inhibitors, foam stabilizers, and accelerators.

* * * * *